United States Patent [19]

Wasserman

[11] 4,292,956
[45] Oct. 6, 1981

[54] CORRUGATED PANEL SOLAR COLLECTOR

[75] Inventor: Kurt J. Wasserman, Westtown, N.Y.

[73] Assignee: Insolar Inc., Port Jervis, N.Y.

[21] Appl. No.: 150,819

[22] Filed: May 19, 1980

[51] Int. Cl.³ .............................................. F24J 3/02
[52] U.S. Cl. .................................. 126/439; 126/443;
126/448; 126/450
[58] Field of Search ............... 126/426, 438, 439, 442,
126/443, 444, 445, 446, 447, 448, 450; 52/222;
160/391, 395; 165/46

[56] References Cited
U.S. PATENT DOCUMENTS

| Re. 29,438 | 10/1977 | MacCracken et al. | 165/46 |
| 4,002,160 | 1/1977 | Mather, Jr. | 126/443 |
| 4,069,811 | 1/1978 | Tabor | 126/443 |
| 4,186,723 | 2/1980 | Coppola | 126/443 |
| 4,210,128 | 7/1980 | Mattson | 126/444 |
| 4,213,498 | 7/1980 | Vandenbossche | 165/46 |

FOREIGN PATENT DOCUMENTS

| 2530152 | 2/1977 | Fed. Rep. of Germany | 126/446 |
| 2826832 | 1/1979 | Fed. Rep. of Germany | 126/450 |

OTHER PUBLICATIONS

"Multi-Purpose Solar Roof Panel"-R. Dycus, Jan. 1977 Publication.

Primary Examiner—Samuel Scott
Assistant Examiner—Lee E. Barrett
Attorney, Agent, or Firm—Jack D. Slobod

[57] ABSTRACT

A two-sided solar collector is housed between a pair of opposed corrugated translucent plates which define a series of side by side elongated cavities. In alternate ones of the cavities are located integral elongated elastomeric solar energy absorbing elements including a series of side by side tubular conduits for heat transfer fluid and stretchable left and right margins terminated with beads that sealably engage the interiors of the empty cavities. A corrugated reflector below the solar collector reflects light passing through the empty cavities toward the cavities having the energy absorbing elements. The elongated solar energy absorbing elements may be configured as one such continuous element which is alternately run back and forth through the alternate cavities to form plural meandering fluid paths through the solar collector. Alternatively, interconnecting elements at the ends of the conduits are provided to define a fluid path passing serially through each conduit of each solar energy absorbing element.

5 Claims, 5 Drawing Figures

CORRUGATED PANEL SOLAR COLLECTOR

FIELD OF THE INVENTION

The present invention relates generally to solar collectors including fluid conduits housed in cavities defined between opposed corrugated surfaces. In its particular aspects, the present invention relates to a corrugated solar collector in which integral solar energy absorbing elements are provided in certain of the cavities, each element including a series of side-by-side conduits and side margins on which are formed bead means which lie within and engage the adjoining cavities.

BACKGROUND OF THE INVENTION

Heretofore, generally horizontal roof panels for the collection of solar radiant energy have been constructed by housing parallel rigid black water conduits in cavities defined between opposed translucent corrugated surfaces or plates. In such a construction, because of intimate contact between the conduits and the lower corrugated surface or plate, thermal insulation has been required between the lower plate and the roof to reduce heat leakage. While a flanged rigid solar energy absorbing element carrying a plurality of black water conduits has heretofore been housed centrally between a pair of opposed channel-shaped windows in a single cavity solar collector, for the purpose of being thermally isolated from the windows, such a construction would not be amenable for use between opposed corrugated plates, because of great expense and difficulty of assembly. The simultaneous assembly of a plurality of such elements in the cavities defined between opposed corrugated surfaces is extremely difficult because of the absence of means for longitudinally aligning the elements in the cavities.

Furthermore, rigid thermal energy absorbing elements particularly of the plastic type, have been difficult to utilize between opposed corrugated surfaces, since any bow or warpage in said elements would lead to assembly difficulties and lack of closing of adjoining cavities.

OBJECTS OF THE INVENTION

It is an object of the present invention to provide a solar collector formed by solar energy absorbing elements lying centrally within elongated cavities defined between opposed corrugated surfaces which elements have a plurality of side-by-side water conduits and bead means for self locating said elements longitudinally along said cavities.

It is a further object of the present invention to provide in a solar collector housed between opposed corrugated plates, flexible and integral solar energy absorbing elements including side-by-side conduits for water and stretchable margins or flanges for supporting said elements centrally within alternate cavities defined between the corrugated plates and including bead means on said margins for sealably and lockably engaging the empty cavities.

SUMMARY OF THE INVENTION

Briefly, the aforementioned and other objects of the present invention are satisfied by providing a solar collector formed by opposed corrugated translucent surfaces which define a plurality of side-by-side elongated cavities. In a plurality of non-adjoining cavities are respectively located a plurality of integral, elongated, black elastomeric, solar energy absorbing elements. Thus, empty cavities adjoin on either side of each cavity having a solar energy absorbing element. Each such element is of substantially constant cross-section and includes a plurality of side-by-side water conduits connected by narrow webs. Left and right stretchable planar flanges or margins are directed respectively from the left and right extreme conduits toward the empty adjoining cavities for supporting the solar energy absorbing element centrally between the corrugated surfaces. The left and right margins are terminated with enlargements or beads which lie within and sealably engage the empty adjoining cavities. The beads prevent convection currents between the filled and empty cavities and maintain the solar energy absorbing elements in longitudinal alignment with the cavities.

The plurality of solar energy absorbing elements may actually be one continuous element which is alternately run back and forth through the spaced apart cavities in a meandering path. A 180 degree bend between each such run is accomplished by cutting off the flanges and beads and cutting the webs to separate the plurality of conduits along the bend for increased flexibility. This manner of construction inherently provides a plurality of side-by-side meandering fluid paths through the solar collector. Alternatively, fluid interconnections may be provided at the end of each solar energy absorbing element to provide back and forth series fluid paths through the conduits of each element.

Another feature of the present invention is that a corrugated reflector of the same pitch as the corrugated plates defining the cavities, may be utilized below the solar collector to reflect the solar energy passing through the empty cavities upwards and sidewards to the rear of the filled cavities.

Other objects, features and advantages of the present invention will become apparent upon perusal of the following detailed description of the preferred embodiments thereof when taken in conjunction with the appended drawing.

DETAILED DESCRIPTION OF THE PREFERRED EMBODIMENTS

Figure 1:
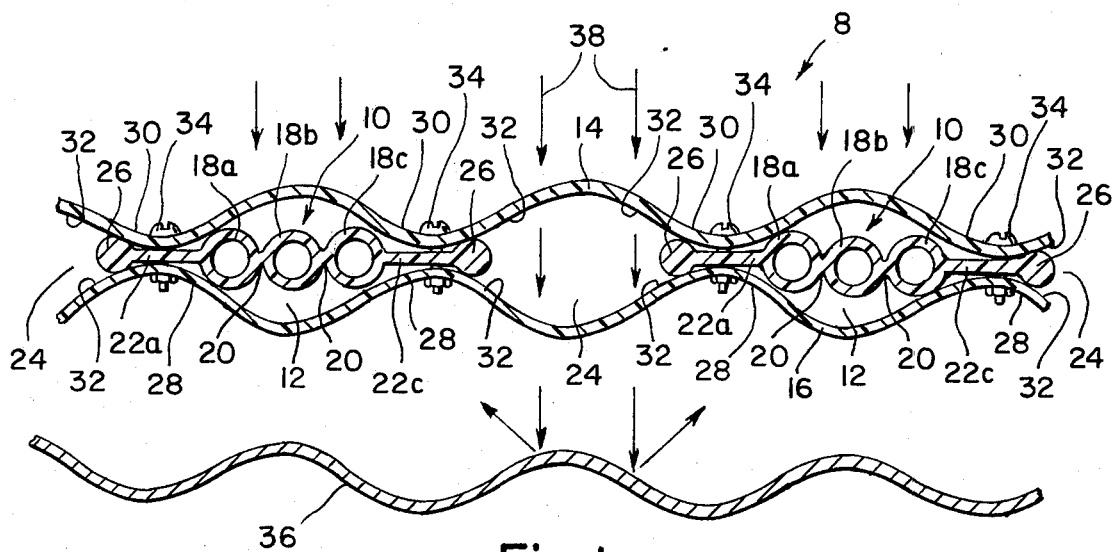
FIG. 1 is a cross-sectional front view of a first embodiment of the solar collector of the present invention.
Figure 2:
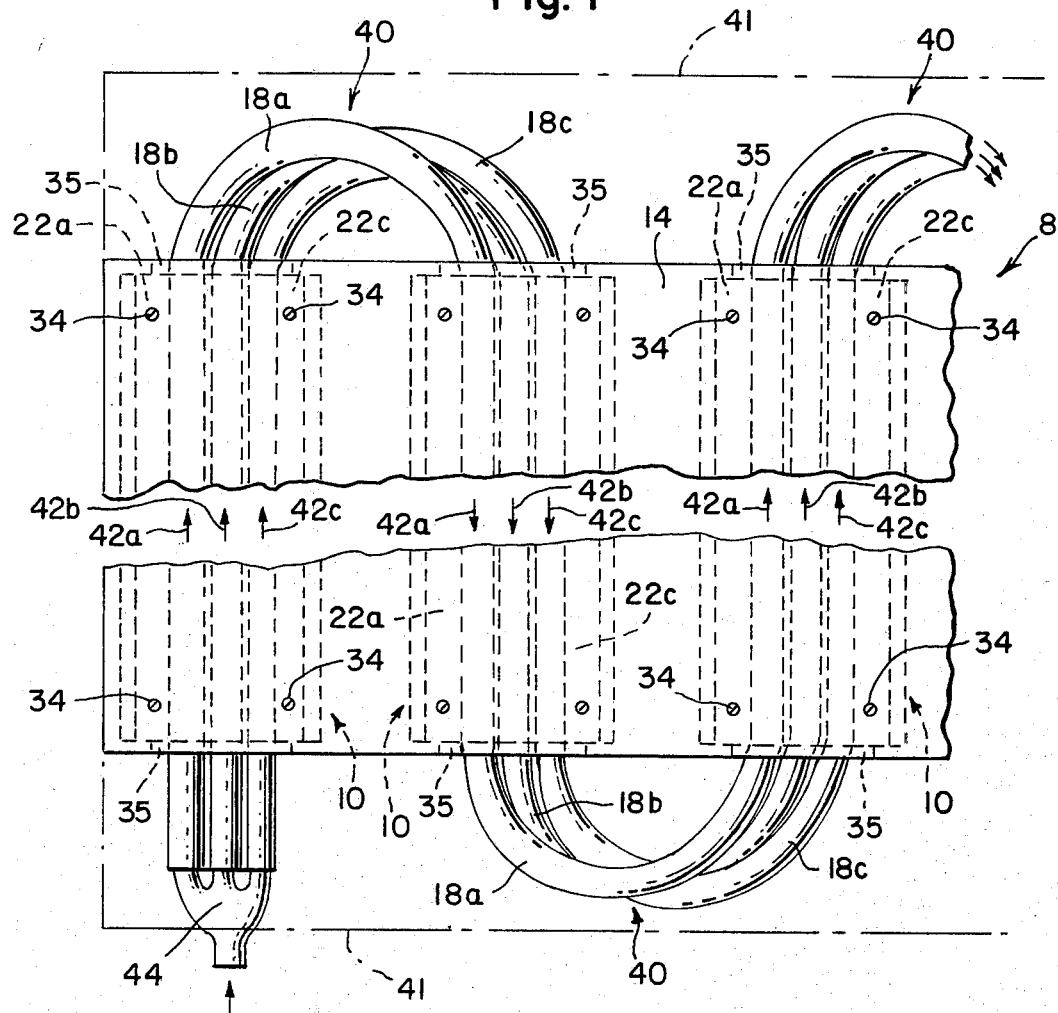
FIG. 2 is a top view of the first embodiment of the solar collector of FIG. 1.

Referring first to FIGS. 1 and 2 of the drawing, the solar collector 8 of the present invention is composed of solar energy absorbing elements 10 housed preferably in alternate cavities 12 defined between opposed similar translucent corrugated top and bottom plastic plates or panels 14 and 16. Panels 14 and 16 are preferably translucent fiberglass reinforced light stabilized polyester modified with acrylic polymer to protect against the wicking of moisture into the fiberglass, which might ultimately cause delamination and opacity. Suitable panels are sold by Reichhold Reinforced Plastic Division of Cleveland, Ohio under the trademarks "alsynite/structoglas" and by the FILON Division of Vistron Corporation of Hawthorne, Calif. For reasons that will become apparent as the dicussion proceeds, the panels should preferably have a randomly depressed or textured surface characterized by minute depressions on the order of one-hundredth of an inch, at least on the sides of the panels that face each other. Such surface is known as granitized.

Dimensionally, the panels 14 and 16 should preferably have a pitch on the order of 2½ or 2⅜ inches, a depth ranging from ½ inch to ⅞ inch, a thickness on the order of 1/32 inch to 1/16 inch, a length ranging from 8 to 12 feet and width ranging from 2 to 5 feet. The pattern of the corrugation is preferably generally sinusoidal although triangular and trapezoidal configurations are also useable. Furthermore, assymetric patterns of corrugation may be utilized.

Each of the solar energy absorbing elements 10 comprise an integral elastomeric member produced by extrusion so as to have a substantially constant section. A suitable material for the element 10 is ethylene-propylene-diene monomer (EPDM) which is filled with carbon black on the range of 10 to 50 percent by weight. The cross section of element 10 includes three side-by-side tubes 18a, 18b, 18c on the order of ⅜ inch inside diameter and 1/16 inch wall thickness. The central tube 18b is respectively coupled to the leftmost tube 18a and the rightmost tube 18c by a pair of integral thin cuttable webs 20. Also included in the cross-section of each solar energy absorbing element 10 are a pair of stretchable co-planar margins or flanges 22a, 22c, on the order of 1/16 inch thick and ½ inch wide, which are directed respectively from the leftmost tube 18a and rightmost tube 18c to points just within the adjoining empty cavities 24 where the margins 22a, 22c are terminated with beads or enlargements 26, of generally circular cross section and on the order of ¼ inch to ⅜ inch in diameter. As will become apparent as the discussion proceeds, the margins 22a, 22c and beads 26 support and longitudinally align each solar energy absorbing element 10 centrally within each cavity 12 with tubes 18a through 18c not contacting the panels 14 and 16.

In the assembly of the solar collector 8 of the present invention, the solar energy absorbing elements 10 are laid centered in alternate valleys of the bottom panel 16 with the margins 22a and 22c resting on the corrugation peaks 28 on either side of the alternate valleys. The distance between the pair of beads 26 and the diameters of the beads are so dimensioned with respect to the pitch and depth of the panels, that when the peaks 30 of the top panel 14 are pressed downward toward the peaks 28 of the bottom panel 16, the inclined sidewalls 32 of the adjoining empty cavities 24 engage beads 26 causing the margin 22a, 22c to be transversely stretched. This stretching action creates a force both holding the tubes 18a through 18c in side-by-side alignment and in longitudinal alignment along the length of the cavities 12. In addition, beads 26 lockably and substantially sealably engage the sidewalls 32 to prevent any convection air currents between the filled cavities 12 and empty cavities 24. The top and bottom panels 14, 16 are drawn and held together by means of a plurality of screw and nut fasteners 34 which are conveniently located in drilled holes (not shown) located at each of the opposed peaks 30, 28. Furthermore, the ends of each filled cavity 12 are packed with silicone rubber adhesive 35 surrounding the cross-section of conduits 18a through 18c to seal cavities 12, thereby preventing longitudinal convection currents. A small weep hole (not shown) may be provided in each silicone rubber seal 35, positioned to permit drainage of condensate. Since the surface of sidewalls 32 is preferably randomly depressed or textured with minute depressions, in the engagement between the beads 26 and sidewalls 32 a small amount of gaseous leakage through these depressions may occur which also serves to alleviate the build-up of moisture vapor pressure due to condensate.

A further feature of the present invention concerns the use of a corrugated reflector panel 36, as of aluminum, which is of the same pitch as the translucent panels 14, 16. The reflector panel 36 is located about 3 inches below the bottom panel 16 and is aligned with its corrugations positioned the same as top panel 14. It will be noted by examination of FIG. 1, rays 38 of solar radiant energy which pass downward directly through the empty cavities 24 of the solar collector are reflected upwards and sidewards toward the bottoms of the filled cavities 12.

In FIG. 2, there is illustrated a technique of providing each of the solar energy absorbing elements 10 as the same continuous element. Therein, the element 10 is run alternately back and forth through and along the length of the alternate cavities 12 and 180 degree bends external of the cavities 12 are accomplished between each such run. To provide sufficient flexibility in the area of each bend 40, the margins 22a, 22c are cut from element 10 and the webs 20 are cut to provide that the three tubes 18a, 18b, 18c, can be separately trained. Insulation packed boxes 41 are preferably provided along each end of the solar collector to cover the bends 40. In this manner three parallel meandering fluid paths 42a, 42b, 42c are formed through the solar collector 8. These paths may be fed in parallel by means of an input manifold 44 at one end of the continuous element 10 and a similar output manifold (not shown) at the other end.

Figure 3:
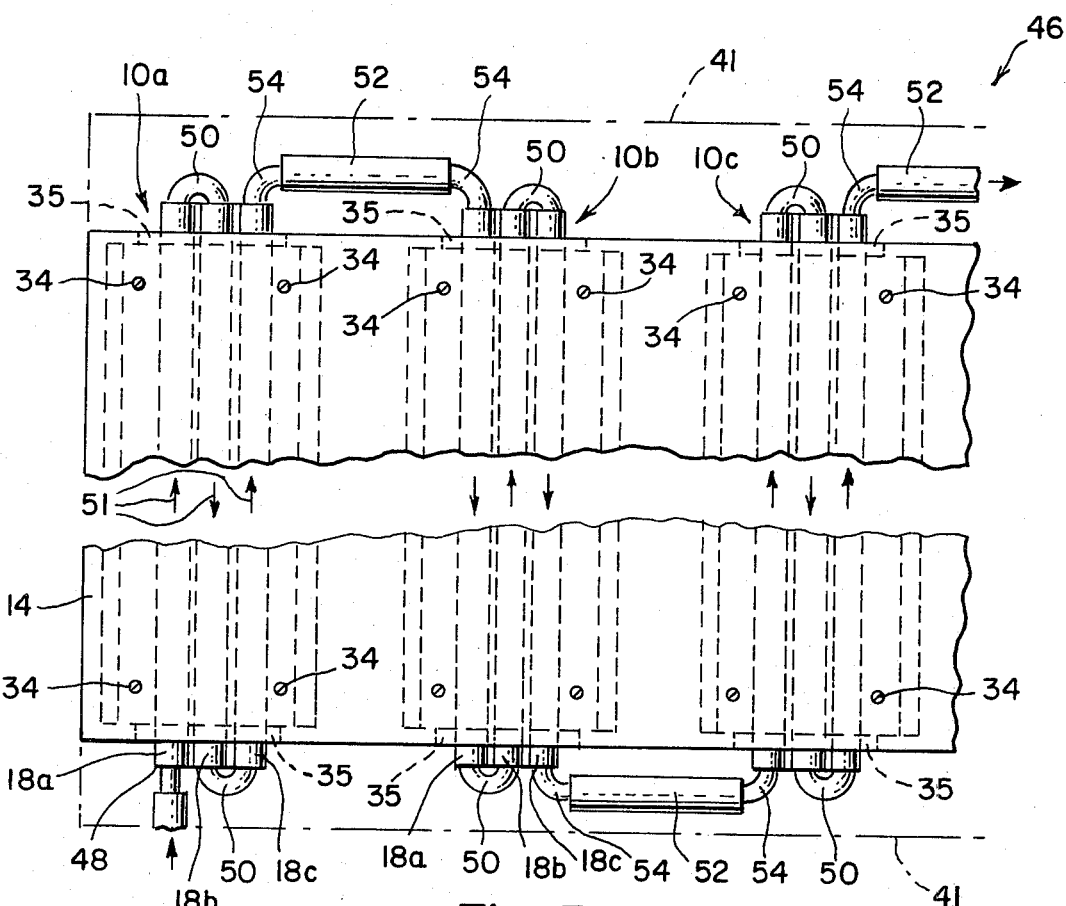
FIG. 3 is a top view, similar to FIG. 2, but of a second embodiment of the solar collector of the present invention.

In FIG. 3, there is illustrated an alternate solar collector 46, having the same cross-section as in FIG. 1, but distinguished from the solar collector as shown in FIG. 2, by the utilization of the individual elongated solar energy absorbing elements 10 which run the length of the alternate cavities 12. By feeding tube 18a of the first element 10 from one end at 48, providing a U-shaped connector 50 between tubes 18a and 18b at the other end and a U-shaped connector 50 between tubes 18b and 18c at the same end as 48, a fluid path 51 is set up which serially passes through tubes 18a, 18b, and 18c. The other end of tube 18c of the first element 10a is then coupled to the end of tube 18a of the second element 10b on the same side by means of tube 52 and elbows 54. Thereafter the pattern of connection is repeated such that the fluid path 51 passes serially through each tube 18 of each element 10. The insulation packed boxes 41 are also utilized in this emobidiment to cover the tubes 52.

It should also be noted with regard to FIG. 2 that by replacing the input manifold 44 with a U-shaped connector 50, between tubes 18b, 18c and the output manifold with a U-shaped connector between tubes 18a, 18b, the three fluid paths 42a, 42b, 42c can be placed in series.

Figure 4:
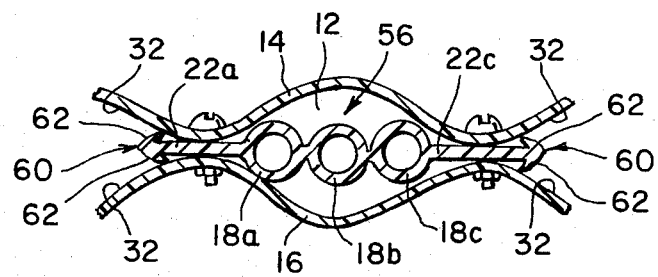
FIGS. 4 and 5 are front cross-sectional views similar to a portion of FIG. 1 but respectively of third and fourth embodiments.
Figure 5:
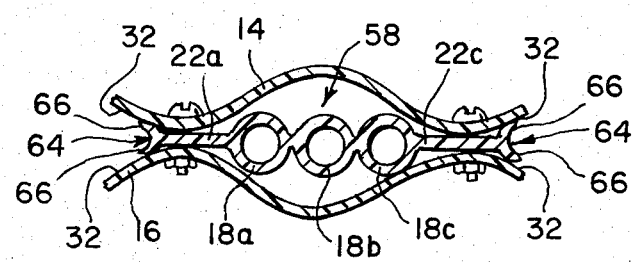

FIGS. 4 and 5 respectively illustrate alternate solar energy absorbing elements 56 and 58 which differ from element 10 only in the shape of the bead. In FIG. 4, there are shown beads 60, each in the shape of arrows, having opposed inwardly facing pointed edges 62 for a high degree of locking action against side-walls 32. In FIG. 5, there are shown crescent-shaped deformable beads 64, to allow the element 58 to cooperate with panels 14, 16 having a range of pitches. The outward facing legs 66 of the crescent-shaped may be flexed toward each other such that each bead 64 assumes an effective diameter which sealably engages the sidewalls 32 while not interfering with the panels being drawn together.

While the preferred embodiments of the present invention have been described in particular detail it should be appreciated that numerous additions to, and modifications and omissions in these details are possible within the intended spirit and scope of the invention. For example, while the solar collector has been described implicitly as being horizontal, through the designation of plates 14 and 16 respectively as "top" and "bottom", the collector might be used in an inclined or even substantially vertical orientation.

What is claimed is:

1. A solar collector apparatus comprising:
   generally planar top and bottom housing members, having opposed corrugated surfaces of substantially the same pitch facing each other so as to define a series of side-by-side longitudinally directed cavities between said housing members, said top housing member being translucent; and
   a plurality of elongated elastomeric solar energy absorbing elements, each element being substantially centrally located in a different one of said cavities and running substantially the entire length of said cavities, each said element being an integral element of substantially constant transverse cross-section, each said element including a series of side-by-side longitudinally directed conduits for heat transfer fluid, a pair of generally planar left and right margins directed transversely respectively from the leftmost and rightmost conduits in said series respectively toward the cavities neighboring on the left and right of each said cavity in which each said solar energy absorbing element is substantially centrally located, each of said left and right margins carrying bead means respectively lying within said neighboring cavities on the left and right and respectively engaging said left and right neighboring cavities along substantially the entire length of said neighboring cavities, said left and right margins of said solar energy absorbing elements being transversely stretched to provide a force holding said bead means in substantially sealing engagement with said neighboring cavities.

2. The apparatus of claim 1 wherein said left and right margins are respectively terminated by said bead means.

3. The apparatus of claim 1 wherein the said solar energy absorbing elements are substantially centrally located in alternate ones of said cavities.

4. The apparatus of claim 3 wherein said bottom housing member is also translucent and further comprising a generally planar reflector spaced below said bottom housing member, said reflector having a corrugated solar energy reflective top surface of substantially the same pitch as said top and bottom housing members, said reflector being positioned relatively to said housing members for reflecting that solar energy which passes through the top and bottom housing members at those cavities in which said conduits are not located, upward and sideward toward those cavities in which said conduits are located.

5. The apparatus of claim 1, wherein at least one of said opposed corrugated surfaces has a randomly depressed finish for enabling leakage of moisture past said bead means between each said cavity and said neighboring cavities on the left and right.

* * * * *